United States Patent [19]

Dieges

[11] 4,431,332
[45] Feb. 14, 1984

[54] MOUNTING STRUCTURE

[75] Inventor: Paul B. Dieges, Perris, Calif.

[73] Assignee: Autotenna, Santa Fe Springs, Calif.

[21] Appl. No.: 428,946

[22] Filed: Sep. 30, 1982

[51] Int. Cl.³ ............................................. F16B 2/02
[52] U.S. Cl. .................................. 403/252; 403/259;
403/90; 174/153 A; 343/715; 343/888
[58] Field of Search ................. 343/715, 888, 887;
403/259, 261, 256, 252, 195, 196, 90, 239;
174/138 A, 153 A, 152 A; 52/110; 248/539

[56] References Cited

U.S. PATENT DOCUMENTS

| | | | |
|---|---|---|---|
| 2,536,053 | 1/1951 | Grashow | 174/153 A |
| 2,536,733 | 1/1951 | Finke et al. | 343/888 |
| 2,727,766 | 12/1955 | Grashow | 343/888 |
| 2,823,771 | 2/1958 | Langheck | 52/110 |
| 2,850,303 | 9/1958 | Chadowski et al. | 343/715 |
| 2,899,485 | 8/1959 | Friedberg et al. | 174/153 A |
| 2,953,630 | 9/1960 | Cejka | 174/153.5 |
| 2,972,744 | 2/1961 | Rickards et al. | 343/888 |
| 3,138,660 | 6/1964 | Cejka | 174/153 A |
| 3,138,661 | 6/1964 | Grashow | 343/888 |
| 4,136,986 | 1/1979 | Grashow et al. | 343/715 X |

FOREIGN PATENT DOCUMENTS

| | | | |
|---|---|---|---|
| 510381 | 2/1955 | Canada | 343/888 |
| 1251392 | 10/1967 | Fed. Rep. of Germany | 343/715 |

*Primary Examiner*—Andrew V. Kundrat
*Assistant Examiner*—Joseph A. Fischetti
*Attorney, Agent, or Firm*—Fraser and Bogucki

[57] ABSTRACT

A mounting structure for mounting an automobile antenna, shaft, mirror or other device within a hole in a support surface such as a fender, at various angles to such support surface, comprises a base which partially passes through the hole, a device-supporting bushing which partially passes through the base, a clamping nut above, and a retainer below, the support surface. The bushing has engagement means above the support surface to mate with the clamping nut and stop means below the support surface against which the retainer pivots and bears. The base has a central aperture receiving the bushing, which can swing through various angles. A spherical upper bearing surface on the base mates with the clamping nut, and includes a flange bearing against the upper support surface. A toothed lower surface and a pair of legs extend downwardly from the base and have inner surfaces parallel to a given plane. Toothed upper edges on the plates on the retainer mate with the toothed base surface and a pivot point on the lower edge, thus engaging the bushing stop means. Each of the retainer plates also have pointed wings whose tops engage the bottom of the support surface adjacent the hole, and means connecting the plates. With the above structure, loosening of the clamping nut permits lateral movement of the retainer and adjustment of the bushing, to place the device in the desired upright or angular position. Fully tightening the clamping nut bends the retainer to engage the teeth on the base, fixing the bushing and device in position.

14 Claims, 7 Drawing Figures

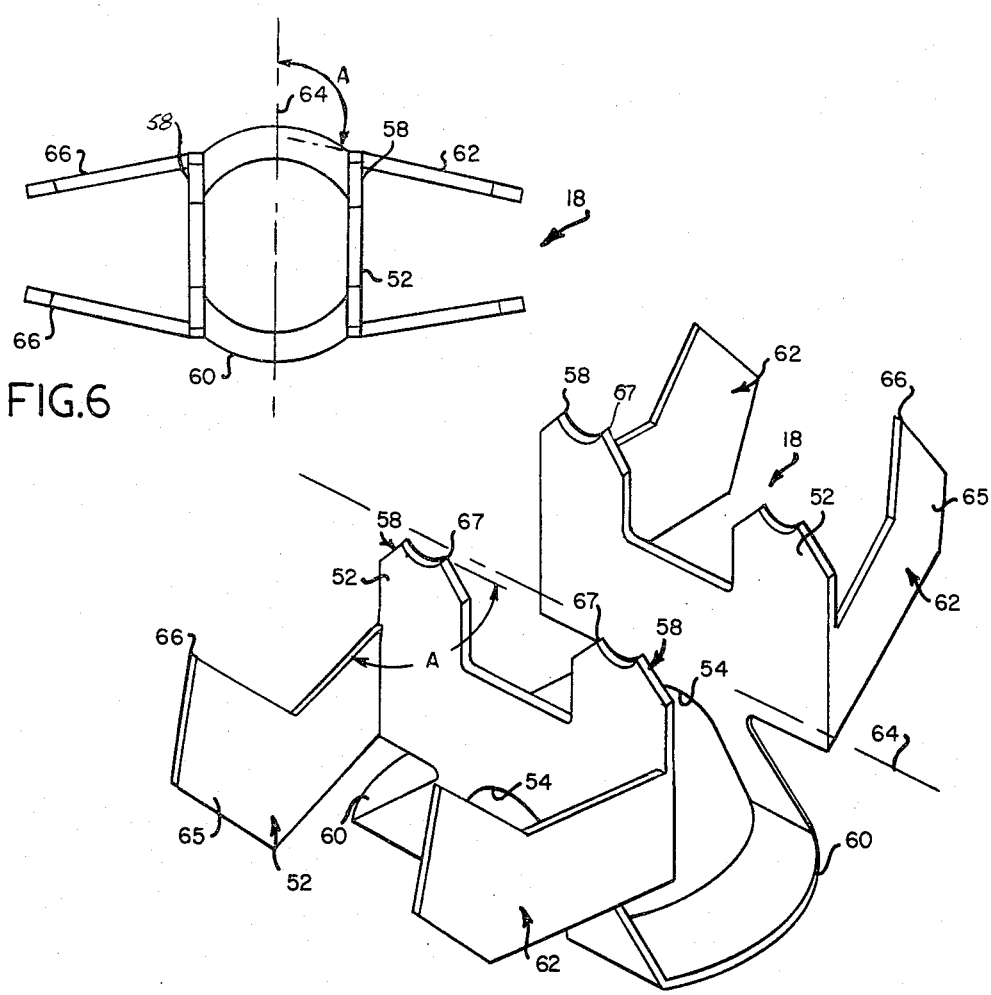
FIG.6
FIG.5
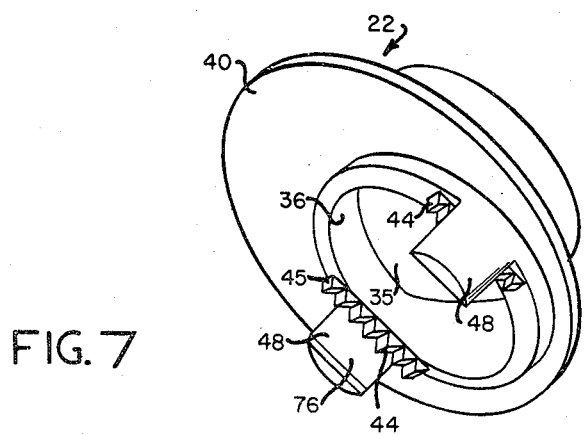
FIG.7

MOUNTING STRUCTURE

BACKGROUND OF THE INVENTION

The present invention relates to a mounting structure for an antenna, shaft, mirror, or other device, particularly an automobile antenna mounting, and more particularly to means for mounting such device, e.g. an automobile antenna, in a desired angular position securely on the body of an automobile.

Antenna mounting structures have been proposed which enable an automobile antenna to be secured on the surface of an automobile from the exterior thereof, as disclosed, for example, in U.S. Pat. Nos. 2,536,053, 3,138,661 and 2,727,766.

Although the devices of the above patents are effective in many applications, there is a need for an automobile antenna mounting which can be assembled on a vehicle entirely from the exterior thereof to mount an antenna securely in an upright or other desired angular position on any of the various body designs, including curved as well as planar surfaces, and within the stringent space limitations of modern automobiles.

U.S. Pat. 4,136,986 illustrates one type of antenna mounting structure having the above noted characteristics.

It is an object of the present invention to provide another novel structure for securely mounting a device such as an automobile antenna in an upright or other desired angular position entirely from the exterior of the mounting surface, and which is readily fabricated and assembled, readily operable, and which is rugged and durable.

SUMMARY OF THE INVENTION

According to the present invention, a mounting device such as an automobile antenna mounting structure for positioning an antenna within a hole of a support surface, such as the fender of an automobile, at various angles within a plane perpendicular to such support surface, comprises a base which partially passes through the hole, a bushing which partially passes through the base, a clamping nut above the support surface and a retainer below the support surface.

The bushing has engagement means above the support surface to mate with the clamping nut and stop means below the support surface against which the retainer pivots and bears. The clamping nut has a spherical lower bearing surface to mate with a corresponding bearing surface on the base and engagement means to mate with the bushing.

The base has a central aperture through which the bushing passes and swings through various angles within a plane perpendicular to the support surface, a flange larger in diameter than the hole in which the antenna is mounted, and which bears against the upper support surface, a toothed lower surface which extends below the hole and a pair of legs which pass through the hole a distance from the bottom of the support surface equal to at least the height of the teeth, and which legs have their inner surfaces parallel to the above noted plane of swinging movement.

The retainer has a pair of plates parallel to such plane and located between each of the legs of the base and the bushing, each of such plates having a toothed upper edge to mate with the toothed lower surface of the base, and a pivot point on the lower edge to mate with the stop means of the bushing. The retainer also has pointed wings on each side of the plates, angled away from the plane which is perpendicular to the support surface, at an angle preferably greater than 45°, the top of each of such pointed wings engaging the bottom of the support surface outside the perimeter of the hole, and connection means between the plates.

Preferably the tops of the pointed wings of the retainer are above the tops of the toothed upper edges of the retainer by at least the height of the teeth thereon, to permit lateral movement of the retainer with respect to the base to change the angle of the bushing, prior to tightening the clamping nut. Further, the retainer is designed so that the connecting means between the plates bends, and the pointed wings are designed to twist, to permit the teeth of the plates and the base to engage as the clamping nut is tightened fully.

Thus, when the clamping nut, which is threadably engaged with the bushing is loosened, the toothed surfaces of the base and the retainer are disengaged, permitting swinging movement of the bushing at its pivot connection with the retainer plates, in a plane perpendicular to the support surface, to a desired angular position, the retainer moving laterally and the top of the wings of the retainer sliding along the lower surface during such movement. When the clamping nut is fully tightened, the toothed surfaces of the base and the retainer become engaged, and the points of the wings on the retainer are tightly engaged with the lower support surface, thus fixing the antenna in the desired angular position.

BRIEF DESCRIPTION OF THE DRAWINGS

The invention will be more clearly understood by reference to the description below of a preferred embodiment, taken in connection with the accompanying drawings wherein:

FIG. 5 is a perspective view of the retainer of the assembly;

FIG. 6 is a plan view of the retainer of FIG. 5; and

FIG. 7 is a bottom perspective view of the base of the assembly.

DETAILED DESCRIPTION OF THE INVENTION

Figure 1:
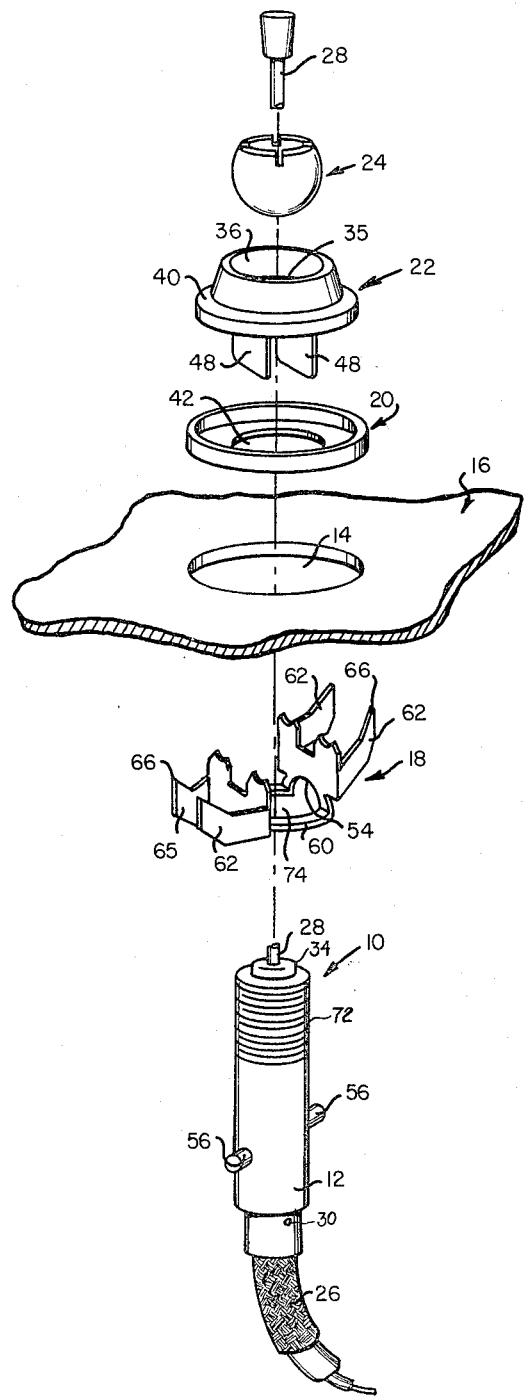
FIG. 1 is an exploded perspective view of the parts constituting an antenna mount according to the invention.

Referring to FIG. 1, an automobile antenna mounting structure is illustrated comprising an antenna assembly 10 having a bushing 12 to be mounted within a hole 14 of a support surface 16 such as an automobile body member, a retainer 18, a washer or disk insulator 20, a base 22 and a clamping nut 24.

Figure 2:
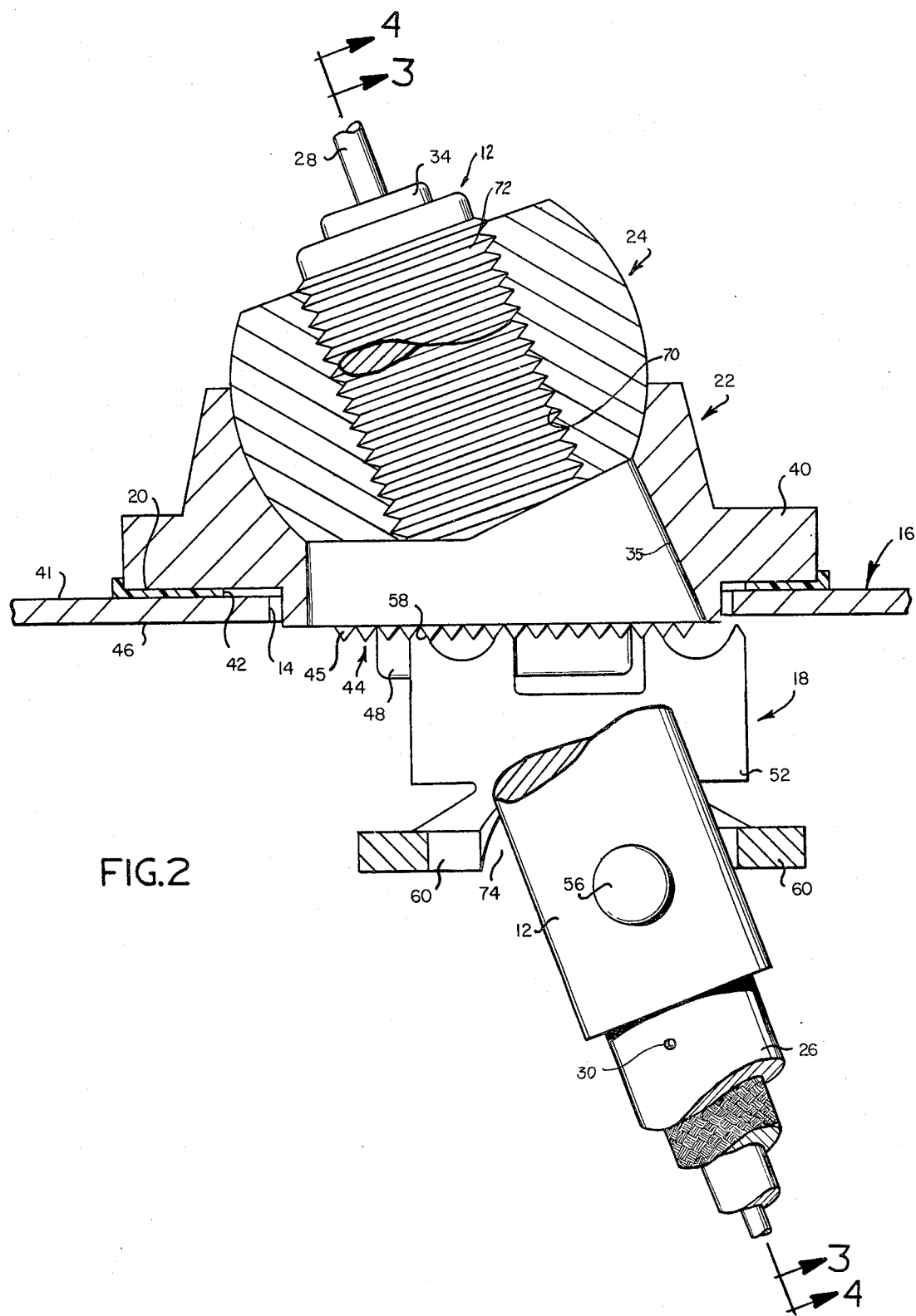
FIG. 2 is a side view, partly in section, of the antenna mount of FIG. 1, assembled in an aperture formed in an automobile body, and positioned at a desired angle.

The antenna assembly 10 comprises a coaxial cable 26 of the conventional type, which is connected by suitable means (not shown) in conventional manner to an antenna mast 28. The coaxial cable is maintained in fixed axial position with respect to the bushing 12 by crimping the coaxial cable within the bushing 12 through radial holes 30, as shown in FIG. 2. An antenna mast insulator 34 is positioned on bushing 12.

Figure 3:
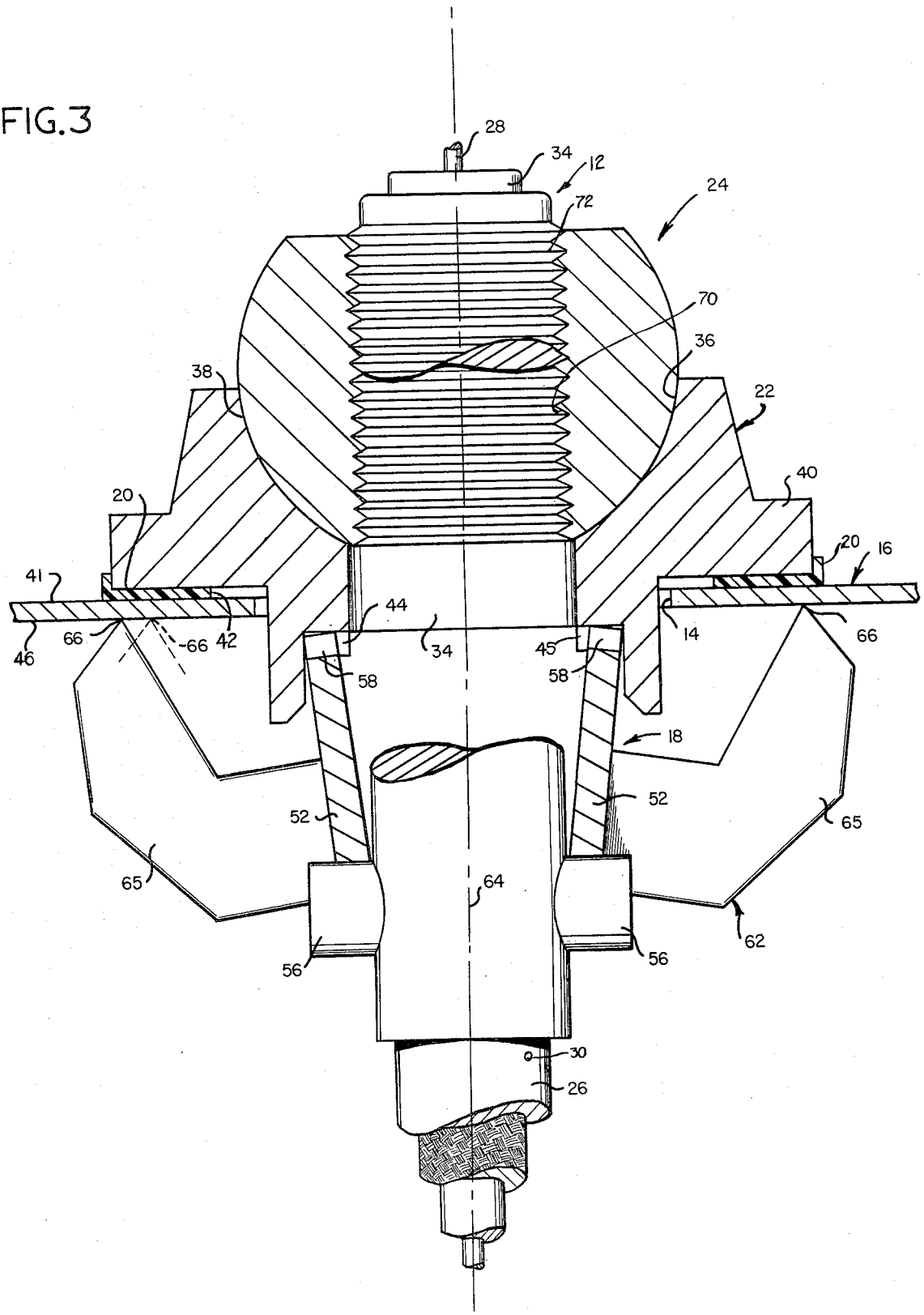
FIG. 3 is a section taken on line 3—3 of FIG. 2, showing the assembly in a fully tightened position.
Figure 4:
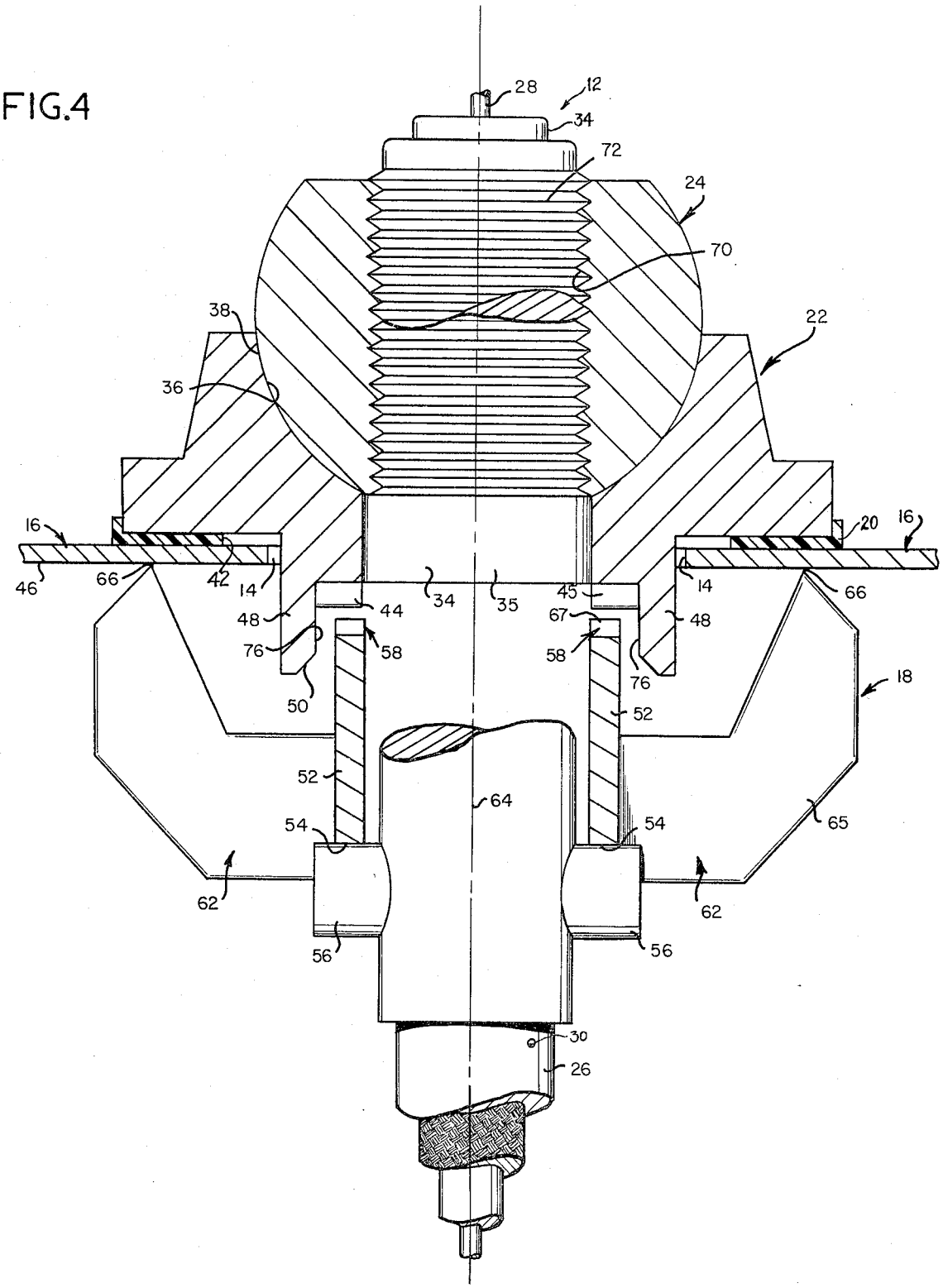
FIG. 4 is a section taken on line 4—4 of FIG. 2, showing the assembly in a hand tightened position only.

Referring now also to FIGS. 2-4, the base 22 has a central aperture 35 through which the bushing 12 passes and is arranged to swing in a plane perpendicular to the support surface 16. A spherical preferably concave bearing surface 36 on the base 22 mates with a corresponding spherical convex bearing surface 38 on the clamping nut 24. Alternatively, the base bearing surface can be convex and that of the nut can be concave. The base 22 is provided with a flange 40 which is larger in diameter than the hole 14 in the supporting surface 16 to bear against the top 41 of the support surface 16. The washer 20, having a circular aperture 42 slightly larger in diameter than the hole 14, and formed of rubber or other suitable moisture-sealing material, is disposed between the flange 40 and the top 41 of the support surface 16. However, such washer is optional.

The base 22, referring also to FIG. 7, has a pair of spaced apart toothed lower surfaces 44, 45 located so that the root of the teeth 44, 45 are positioned at least below the bottom 46 of the support surface 16 (FIGS. 2-4). Such toothed lower surfaces 44, 45 are located between the central aperture 35 of the base and a pair of depending legs 48 on opposite sides of the central aperture 35. Such legs pass through the hole 14 of the support surface 16 a distance at least equal to the height of the teeth of the toothed surfaces 44, 45, and preferably at least twice, e.g. about 2 to 10 times, and particularly about 3 times, the height of such toothed surface. The legs 48 have a clipped corner 50 (FIG. 4 only) to facilitate assembly of the mounting structure.

The retainer 18, referring also to FIGS. 5 and 6, comprises a pair of spaced apart plates 52 having oppositely aligned pivot points or surfaces 54 on the lower edges of the plates, which are adapted to mate with stop means in the form of diagonally disposed outwardly extending pins 56 mounted on the bushing 12. Each of the plates 52 has a toothed upper edge 58 adapted to mate with an opposed toothed lower surface 44, 45 of the base 12. The plates 52 are connected by a pair of substantially semicircular rings 60 which are capable of bending.

A pair of pointed wings 62 are mounted on the outer side of each of the plates 52 and are angled away from the plane which is perpendicular to the support surface 16, as indicated by dotted line 64 in FIGS. 5 and 6, at an angle A preferably greater than 45°. The top of the wings 62 on their outer portions 65 are pointed, as indicated at 66. The pointed tops 66 of the wings 62 extend above the tops of teeth 67 on the toothed upper edge 58 of plates 52 by at least the height of such teeth, as best seen in FIG. 4. The points 66 on wings 62 are adapted to engage the bottom 46 of the support surface 16 outside the perimeter of the hole 14 of the support surface, as seen in FIGS. 3 and 4. The wings 62 are capable of twisting or bending, for the purpose noted below.

The clamping nut 24 has internal threads 70 for engagement with external threads 72 at the top of the bushing 12, for maintaining the bushing and the retainer 18 thereon in position within hole 14 of the support surface.

In assembling the mounting device of the invention on the body of an automobile, the bushing 12, with the coaxial cable 26 and the mast 28 mounted thereon, is inserted in the hole 14 in the support surface 16. The retainer 18 is then inserted through the hole 14 over the mast 28 until the pivot surfaces 54 come to rest on the pins 56 extending outwardly from the bushing 12. The retainer 18 can be set at an angle to slide through the hole 14 for this purpose. The washer 20 and base 22 are then dropped over the mast 28, aligning the teeth 44, 45 on the bottom of the base 22, with the teeth 58 on the upper side of the retainer 18, but spaced apart therefrom. The nut 24 is then installed with the convex bearing surface 38 mating in the concave bearing surface 36 of the base 22 and partially tightened onto the external thread on the bushing 12 to give light frictional restraint or a degree of control against free movement. The angle of the antenna mast 28 relative to the support surface 16 is then adjusted to the desired angle. Then the nut 24 is fully tightened, pressing the upper points 66 on the retainer 18 against the undersurface 46 of the support 16 and causing bending of the retainer 18 at the connecting rings 60. At full tightening the downwardly facing teeth 44, 45 engage the teeth 67 on the upper edges 58 of the plates 52, locking the bushing 12 and mast 28 securely at the selected angle, as seen in FIG. 3.

If it is desired to change or adjust the angle of the antenna mast 28 with respect to the support surface 16, the clamping nut 24 is turned in the direction to cause the bushing 12 to move downwardly, to cause the toothed upper edges 58 of the plates 52 on the retainer 18 to disengage from the toothed surface 44 of the base 22, as illustrated in FIG. 4. In this position, since the tops 66 of the pointed wings 62 are above the tops of the teeth 58 on the upper edge of the plates 52, by at least the height of the teeth, the points 66 remain in slidable engagement with the bottom 46 of the support surface 16. This permits lateral movement of the retainer 18 with respect to the base 22, between and guided by the legs 48, along a line parallel to the perpendicular plane at 64, while pivoting on the pins 56 of the bushing, to thereby permit the bushing 12 to swing and thus change the angle of the bushing and the mast 28 of the antenna.

When the bushing 12 has been positioned at the desired angle, as illustrated for example in FIG. 2, the clamping nut 24 is tightened fully, drawing the bushing upwardly in the hole 14. During such upward movement, the pointed wings 62 twist and connecting ring 60 bends thus causing the connecting ring 60 between the plates 52 of the retainer 18 to bend, as noted in FIG. 3, to permit the toothed upper edges 58 of the plates 52 on the retainer 18 to engage the toothed surface 44 of the base 22. During such twisting and bending, the points 66 at the top of the wings slide outwardly along the bottom 68 of the support surface 16, from the dotted line position to the full line position shown in FIG. 3. Such sliding of the points of the wings against the bottom of the support surface during tightening of the clamping nut scrapes away corrosion on the bottom of the support surface for better contact. Also, the twisting of the wings during such upward movement of the plates 52 to make contact with the toothed surface 44 of the base, causes the top portions of such plates to tilt outwardly, as seen in FIG. 3.

Although the invention concept is particularly directed to mounting an antenna on an automobile, it will be understood that the mounting structure of the invention can be employed to mount other devices such as a shaft, mirror, and the like, within a hole in a support surface, at various angles within a plane perpendicular to such support surface.

From the foregoing, it will be seen that the invention provides a reliable and durable mounting structure, particularly for use as an automobile antenna, which is readily operable to mount such antenna or other device in a desired upright or angular position, and which can be fabricated from inexpensive bendable metal parts such as steel. Mounting devices in accordance with the invention can be put in place from one side, locked securely with the antenna or other structure in a desired attitude, and repositioned in the same way. The bending forces acting on the retainer together with the positive locking assured by the engaging teeth and wing tips provide firm engagement in all desired orientations. The structure is nonetheless economical to construct and easy to use.

While various alternatives, modifications and variations of the invention will be apparent to those skilled in the art, the invention is not to be taken as limited except by the scope of the appended claims.

What is claimed is:

1. A mounting structure for mounting a device securely in a selected attitude, within a hole in a support surface, from one side of the surface, comprising:
    a base disposed adjacent the upper side of the support surface, said base being adapted to partially pass through said hole and having an arcuate bearing surface on the upper side thereof and a central aperture therein;
    bushing means fitting through the central aperture of said base and coupled to support said device therein and including engagement means extending therefrom in the lower region thereof;
    clamping means threadedly coupled to the upper end of said bushing and including a lower bearing surface mating with the arcuate surface of said base through a range of positions;
    retainer means disposed about said bushing below said support surface and contacting the engagement means;
    said base including a toothed lower surface extending below the bottom of said support surface; and
    said retainer means having a toothed upper surface facing the toothed lower surface of said base, and including spaced apart wing means engaging the bottom of said support surface outside the perimeter of said hole, the retainer means deforming when the clamping means is tightened on the bushing means such that the facing teeth come into engagement.

2. The mounting structure of claim 1, wherein retainer means further comprises ring means interconnecting said wing means and said wing means extend upwardly beyond the toothed upper surface until sufficient deformation of said retainer means.

3. A mounting structure for mounting a device in the form of an antenna, shaft, mirror and the like, within a hole in a support surface, at various angles within a plane perpendicular to said support surface, which comprises:
    a base adapted to partially pass through said hole;
    a bushing which partially passes through said base and is adapted to support said device therein;
    a clamping nut mounted on the upper end of said bushing, said clamping nut having a lower bearing surface to mate with said base, and a matching engagement means to mate with said bushing;
    a retainer means adapted to be positioned below said support surface;
    said bushing having engagement means to mate with said clamping nut and pivot means against which said retainer means pivots and bears;
    said base having a central aperture through which said bushing passes and is adapted to swing in said plane through said various angles, an upper bearing surface to mate with the lower bearing surface of said clamping nut, flange means adapted to bear against the top of said support surface, and a toothed lower surface adapted to be disposed below the bottom of said support surface; and
    said retainer means comprising plate means, said plate means having a toothed upper surface adapted to mate with the toothed lower surface of said base, a pivot point on said plate means to mate with said pivot means of said bushing, and wing means carried on said plate means and adapted to engage the bottom of said support surface outside the perimeter of said hole.

4. The mounting structure of claim 3, said base having depending legs, and said plate means comprising a pair of parallel plates mounted on said retainer means and disposed between said legs and said bushing, each of said plates having a toothed upper surface and having a pivot point on the lower edge thereof, to mate with said pivot means of said bushing.

5. The mounting structure of claim 4, said wing means comprising at least two wings mounted on each of said plates and having end portions extending upwardly to slidably engage the bottom of said support surface to permit lateral movement of said retainer means with respect to said base when the toothed upper surfaces of said plates are disengaged from the toothed lower surface of said base, to change the angle of said bushing, said wings making fixed contact with the bottom of said support surface when the toothed upper surfaces of said plate engage the toothed lower surface of said base to maintain the bushing in a fixed angular position.

6. A mounting structure for mounting a device in the form of an antenna, shaft, mirror and the like, within a hole in a support surface, at various angles within a plane perpendicular to said support surface, which comprises:
    a base adapted to partially pass through said hole;
    a bushing which partially passes through said base and is adapted to support said device therein;
    a clamping nut mounted on the upper end of said bushing, said clamping nut having a lower bearing surface to mate with said base, and a matching engagement means to mate with said bushing;
    a retainer means adapted to be positioned below said support surface;
    said bushing having engagement means to mate with said clamping nut and pivot means against which said retainer means pivots and bears;
    said base having a central aperture through which said bushing passes and is adapted to swing in said plane through said various angles, an upper bearing surface to mate with the lower bearing surface of said clamping nut, a flange adapted to bear against the top of said support surface, a toothed lower surface adapted to be disposed below the bottom of said support surface, and a pair of legs on opposite sides of said central aperture, and adapted to pass through said hole a distance from the bottom of said support surface equal to at least the height of the teeth of said toothed lower surface; and
    said retainer means comprising a pair of spaced plates parallel to said plane and disposed between each of said legs and said bushing, said plates having a toothed upper surface adapted to mate with said toothed lower surface of said base, a pivot surface on the lower edge of each of said plates to mate with said pivot means of said bushing, wing means on each side of said plates, said wing means having top portions adapted to engage the bottom of said support surface outside the perimeter of said hole, and connecting means between said plates forming an aperture through which said bushing passes, said plates being disposed parallel to said plane and located between each of said legs of said base, and said bushing.

7. The mounting structure of claim 6, said lower bearing surface of said clamping nut and said upper bearing surface of said base being spherical mating surface, said matching engagement means of said clamping nut and said bushing being a threaded engagement.

8. The mounting structure of claim 6, said flange on said base having a diameter larger than said hole, and said pair of legs on said base passing through said hole a distance from the bottom of said support surface, between about 2 and 10 times the height of the teeth of said toothed lower surface of said base.

9. The mounting structure of claim 6, said wing means on said retainer means comprising a pair of wings disposed outwardly from each of said plates, said wings being disposed at an angle to said plane perpendicular to said support surface, greater than 45°, the top portions of said wings having points thereon adapted to slidably engage the bottom of said support surface.

10. The mounting structure of claim 9, wherein the tops of said pointed wings are disposed above the top of the teeth of said toothed upper surfaces of the plates of said retainer means by at least the height of said teeth, to permit lateral movement of said retainer means with respect to said base, while pivoting on the pivot means of said bushing, with said tops of said wings slidably engaging the bottom of said support surface, to change the angle of said bushing, prior to fully tightening said clamping nut, and wherein said pointed wings twist, and wherein said connecting means between the plates of said retainer means bends, to permit the toothed upper surfaces of said plates and the toothed lower surface of said base to engage when said clamping nut is fully tightened.

11. The mounting structure of claim 6, said toothed lower surface of said base being disposed between each of the legs on said base and said central aperture of said base, and said connecting means between the plates of said retainer means being substantially semicircular rings.

12. The mounting structure of claim 6, including a disk insulator positioned between the flange on said base and the top of said support surface.

13. The mounting structure of claim 6, said pair of legs on said base passing through said hole a distance from the bottom of said support member of about three times the height of the teeth of said toothed lower surface of said base.

14. A mounting structure for mounting a device in the form of an antenna, shaft, mirror and the like, within a hole in a support surface, at various angles within a plane perpendicular to said support surface, which comprises:

a base adapted to partially pass through said hole;

a bushing which partially passes through said base and is adapted to support said device therein;

a clamping nut mounted on the upper end of said bushing above said support surface, said clamping nut having a lower spherical bearing surface to mate with said base, and a threaded inner surface for mating engagement with said bushing;

a retainer means adapted to be positioned below said support surface;

said bushing having external threads at its upper ends for matching engagement with said clamping nut and outwardly extending diagonally disposed pivot pins against which said retainer means pivot and bears;

said base having a central aperture through which said bushing passes and is adapted to swing in said plane through said various angles, an upper spherical bearing surface to mate with the lower spherical bearing surface of said clamping nut, a flange larger in diameter than said hole and adapted to bear against the top of said support surface, a toothed lower surface having teeth wherein the root of said teeth are adapted to be disposed at least below the bottom of said support surface, and a pair of legs on opposite sides of said central aperture and which pass through said hole a distance from the bottom of said support surface equal to at least twice the height of the teeth of said toothed lower surface and having their inner surfaces parallel to said plane, said toothed lower surface being disposed between each of the legs and said central aperture of said base;

said retainer means comprising a pair of spaced plates parallel to said plane and disposed between each of said legs and said bushing, each of said plates having a toothed upper surface adapted to mate with said toothed lower surface of said base, a pivot surface on the lower edge of each of said plates to mate with said pivot pins of said bushing, a pair of wings disposed outwardly from each of said plates, said wings being disposed at an angle to said plane perpendicular to said support surface, greater than 45°, said wings each having a top portion and a point thereon adapted to slidably engage the bottom of said support surface outside the perimeter of said hole, and substantially semicircular connecting rings between said plates, forming an aperture through which said bushing passes, said plates being disposed parallel to said plane and located between each of said legs of said base, and said bushing;

and wherein the tops of said pointed wings are above the top of the teeth of said upper toothed surfaces of said plates by at least the height of said teeth, to permit lateral movement of said retainer with respect to said base, while said plates pivot on the pivot pins of said bushing with the tops of said wings in slidable engagement with the bottom of said support surface, to change the angle of said bushing, prior to fully tightening said clamping nut, and wherein said pointed wings twist, and the connecting rings between said plates of said retainer means bend, to permit the teeth of said plates and the teeth of said base to engage as said clamping nut is fully tightened.

* * * * *